United States Patent
Park et al.

(10) Patent No.: US 11,192,980 B2
(45) Date of Patent: Dec. 7, 2021

(54) PREPARATION METHOD OF POLYARYLENE SULFIDE

(71) Applicant: LG CHEM, LTD., Seoul (KR)

(72) Inventors: Eunju Park, Daejeon (KR); Hansol Kim, Daejeon (KR); Joong Jin Han, Daejeon (KR); Hyun Woog Ryu, Daejeon (KR); Kwonsu Jung, Daejeon (KR); Yong Jin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/616,841

(22) PCT Filed: Nov. 23, 2018

(86) PCT No.: PCT/KR2018/014546
§ 371 (c)(1),
(2) Date: Nov. 25, 2019

(87) PCT Pub. No.: WO2019/103534
PCT Pub. Date: May 31, 2019

(65) Prior Publication Data
US 2021/0171715 A1 Jun. 10, 2021

(30) Foreign Application Priority Data
Nov. 24, 2017 (KR) .................. 10-2017-0158921

(51) Int. Cl.
*C08G 75/0259* (2016.01)
*C08G 75/0254* (2016.01)
*C08G 75/0281* (2016.01)

(52) U.S. Cl.
CPC .................. *C08G 75/0254* (2013.01)

(58) Field of Classification Search
CPC C08G 75/14; C08G 75/0263; C08G 75/0268; C08G 75/0259; C08G 75/025; C08G 75/0281
See application file for complete search history.

(56) References Cited

U.S. PATENT DOCUMENTS

| 4,661,584 A | 4/1987 | Idel et al. |
| 5,093,469 A | 3/1992 | Senga |
| 5,438,115 A | 8/1995 | Fahey et al. |
| 5,635,587 A | 6/1997 | Koyama et al. |
| 2010/0210813 A1 | 8/2010 | Foder et al. |
| 2011/0178268 A1 | 7/2011 | Suzuki et al. |
| 2011/0319587 A1 | 12/2011 | Hinokimori |

(Continued)

FOREIGN PATENT DOCUMENTS

| CN | 102977369 A | 3/2013 |
| EP | 0658587 A2 | 6/1995 |

(Continued)

OTHER PUBLICATIONS

Fahey, et al.: Mechanism of Poly(p-phenylene sulfide) Growth from p-Dichlorobenzene and Sodium Sulfide, XP9519680, Macromolecules, vol. 24, No. 15, Jul. 1, 1991, pp. 4242-4249.

*Primary Examiner* — Shane Fang
(74) *Attorney, Agent, or Firm* — Dentons US LLP

(57) ABSTRACT

The present disclosure relates to a preparation method of a polyarylene sulfide, and this method may produce a polyarylene sulfide having properties equal to or higher than those of the conventional method at a high yield by adding an aliphatic amino acid hydrochloride in addition to existing materials for dehydration.

13 Claims, 1 Drawing Sheet

(56) References Cited

U.S. PATENT DOCUMENTS

| | | |
|---|---|---|
| 2014/0128568 A1 | 5/2014 | Hinokimori |
| 2015/0087776 A1 | 3/2015 | Chiong et al. |
| 2015/0344632 A1 | 12/2015 | Chen et al. |
| 2016/0060397 A1 | 3/2016 | Watanabe et al. |
| 2017/0137573 A1 | 5/2017 | Suzuki et al. |
| 2019/0153162 A1 | 5/2019 | Konno et al. |

FOREIGN PATENT DOCUMENTS

| | | |
|---|---|---|
| JP | 0674325 B1 | 9/1994 |
| JP | 2007269638 A | 10/2007 |
| JP | 2009-057414 A | 3/2009 |
| JP | 2010-106179 A | 5/2010 |
| JP | 5623277 B2 | 11/2014 |
| KR | 1994-0000078 A | 1/1994 |
| KR | 960004403 A | 2/1996 |
| KR | 10-2011-0086702 A | 7/2011 |
| KR | 10-2011-0118780 | 11/2011 |
| KR | 10-2015-0085087 A | 7/2015 |
| KR | 10-2015-0104096 A | 9/2015 |
| WO | 2016/133740 A1 | 8/2016 |
| WO | 2017/057732 A1 | 4/2017 |

[FIG. 1]
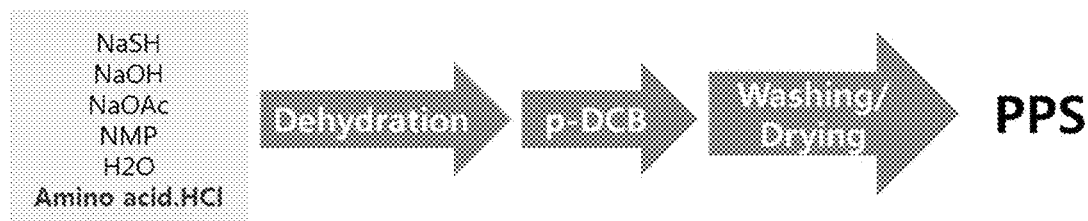
[FIG. 2]
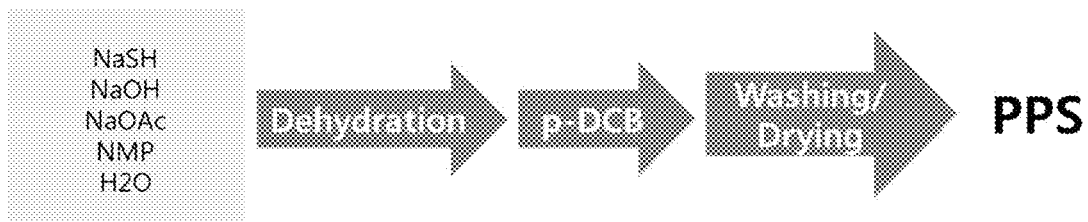

PREPARATION METHOD OF POLYARYLENE SULFIDE

The present application is a National Phase entry pursuant to 35 U.S.C. § 371 of International Application No. PCT/KR2018/014546 filed on Nov. 23, 2018, and claims priority to and the benefit of Korean Patent Application No. 10-2017-0158921 filed on Nov. 24, 2017 with the Korean Intellectual Property Office, the disclosures of which are incorporated herein by reference in its entirety.

FIELD

The present disclosure relates to a preparation method of a polyarylene sulfide having a high degree of polymerization, and which exhibits excellent strength, heat resistance, flame retardancy, and processability when processed into a molded product, at a high yield.

BACKGROUND

Polyarylene sulfide (PAS), which is represented by polyphenylene sulfide (PPS), has been widely used in automobiles, electrical and electronic products, machinery, and the like to replace metals, especially die casting metals such as aluminum and zinc, due to its excellent strength, heat resistance, flame retardancy, and processability. Particularly, since the PPS resin has excellent flowability, it is suitable for use as a compound by kneading it with a filler such as glass fiber or a reinforcing agent.

Generally, PAS is prepared by polymerizing a sulfur source and a dihalogenated aromatic compound in the presence of an amide-based compound such as N-methyl pyrrolidone (NMP). A molecular weight modifier such as an alkali metal salt may optionally be further used.

As the PAS is widely used for various purposes, particularly used as a molded product by melt-processing, PAS having excellent product characteristics and moldability such as a high degree of polymerization, specifically high melt viscosity, is required. Along with the increase in demand for PAS, it is also required to improve the yield in the preparation of PAS. For example, Japanese Patent No. 5623277 discloses a production process of a granular PAS including a step of adding an aromatic compound such as a dihalo aromatic compound and a trihalo aromatic compound to a liquid phase in a polymerization reaction system after a phase-separation polymerization process, and a step of cooling the liquid phase. This process can produce granular PAS at a high yield while maintaining melt viscosity at a high level. There has been a demand for a method capable of further improving the yield of PAS having a high degree of polymerization.

Therefore, in the process for preparing a polyarylene sulfide in which a sulfur source and a dihalogenated aromatic compound are subjected to a polymerization reaction in the presence of an amide-based compound, research on a preparation method of a polyarylene sulfide having a high degree of polymerization at a high yield is required.

SUMMARY

The present disclosure provides a preparation method of a polyarylene sulfide having excellent strength, heat resistance, flame retardancy, processability, and the like, at a high yield by adding an aliphatic amino acid hydrochloride in a dehydration reaction for preparing a sulfur source.

According to an embodiment of the present disclosure, a preparation method of a polyarylene sulfide is provided, including: a first step of preparing a sulfur source including a sulfide of an alkali metal and a mixed solvent of water and an amide-based compound by dehydrating a hydrosulfide of an alkali metal and a hydroxide of an alkali metal in the presence of an organic acid salt of an alkali metal and a $C_{1-20}$ aliphatic amino acid hydrochloride in a mixed solvent of water and an amide-based compound; and a second step of adding a dihalogenated aromatic compound and an amide-based compound to a reactor containing the sulfur source, and performing a polymerization reaction to prepare a polyarylene sulfide.

In the present disclosure, the polyarylene sulfide may be produced at a yield of about 66.5% or more, and may have a melting point (Tm) of 270° C. to 300° C. and a crystallization point (Tc) of 180° C. to 250° C.

According to the present disclosure, a polyarylene sulfide having excellent strength, heat resistance, flame retardancy, processability, and the like can be prepared at a high yield by additionally introducing an aliphatic amino acid hydrochloride into a dehydration reaction for preparing a sulfur source used in the polymerization of a polyarylene sulfide.

BRIEF DESCRIPTION OF THE DRAWINGS

FIG. 1 is a schematic view of a process for preparing a polyarylene sulfide of Example 1 according to an embodiment of the present disclosure.

FIG. 2 is a schematic view of a process for preparing a polyarylene sulfide of Comparative Example 1 according to the prior art.

DETAILED DESCRIPTION

In the present disclosure, the terms "first", "second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess", when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed, and it should be understood that the present invention includes all modifications, equivalents, and replacements within the idea and technical scope of the present invention.

Hereinafter, the present disclosure will be described in detail.

According to an embodiment of the present disclosure, a preparation method of a polyarylene sulfide in which a polymerization reaction of a sulfur source and a dihalogenated aromatic compound provides the polyarylene sulfide at a high yield by additionally introducing an aliphatic amino acid hydrochloride into a dehydration reaction for preparing a sulfur source.

The preparation method of a polyarylene sulfide includes: a first step of preparing a sulfur source including a sulfide of an alkali metal and a mixed solvent of water and an amide-based compound by dehydrating a hydrosulfide of an alkali metal and a hydroxide of an alkali metal in the presence of an organic acid salt of an alkali metal and a $C_{1-20}$ aliphatic amino acid hydrochloride in a mixed solvent of water and an amide-based compound; and a second step of adding a dihalogenated aromatic compound and an amide-based compound to a reactor containing the sulfur source, and performing a polymerization reaction to prepare a polyarylene sulfide.

In particular, the present disclosure may easily produce a polyarylene sulfide capable of providing a final polymer product having a thermal property equivalent to or higher than that of the conventional polymer product by facilitating the formation of sodium (4-metalamino)butanoate (SMAB), which is known to be helpful for the polymerization reaction, through adding an aliphatic amino acid hydrochloride in the dehydration to prepare a sulfur source which will undergo a polymerization reaction with a dihalogenated aromatic compound to produce the polyarylene sulfide. The preparation method of a polyarylene sulfide of the present disclosure can also improve the yield, and increase the amount of the final product.

First, the preparation method of a polyarylene sulfide according to an embodiment of the present disclosure will be described in each step.

The above-described first step is preparing a sulfur source.

The sulfur source is prepared by dehydrating a hydrosulfide of an alkali metal, a hydroxide of an alkali metal, and an aliphatic amino acid hydrochloride in a mixed solvent of water and an amide-based compound. Therefore, the sulfur source may include the mixed solvent of water and an amide-based compound remaining after the dehydration, together with a sulfide of an alkali metal prepared by the reaction of the hydrosulfide of an alkali metal with the hydroxide of an alkali metal.

In addition, the present disclosure may facilitate the formation of SMAB, which is known to be helpful for the polymerization reaction of a polyarylene sulfide, by adding an aliphatic amino acid hydrochloride such as (methylamino)butyric acid hydrochloride in the preparation of a sulfur source. Thereafter, in the present disclosure, a polyarylene sulfide is prepared at a high yield by continuously polymerizing the sulfur source, the dihalogenated aromatic compound, and the amide-based compound.

The aliphatic amino acid hydrochloride may be a hydrochloride of a linear or cyclic $C_{1-20}$ aliphatic amino acid, a hydrochloride of a linear or cyclic $C_{1-12}$ aliphatic amino acid, or a hydrochloride of a linear or cyclic $C_{1-6}$ aliphatic amino acid. Herein, the aliphatic amino acid may have a side chain such as a $C_{1-4}$ alkyl, a $C_{6-14}$ aryl, a combination thereof, a $C_{1-4}$ alkylthio-$C_{1-4}$ alkyl, or at most three of a $C_{6-14}$ heterocyclic substituent containing a heteroatom such as N, O, or S. The amino group of the aliphatic amino acid may be present as $NH_2$, NRH, or $NR_2$, wherein R is an alkyl group, preferably a $C_{1-4}$ alkyl group. The two R groups may be two terminals of an alkylene chain containing a carboxyl group as a side chain, which form a ring together with an NH group. The amino group may be attached to α-, β-, γ-, or ε-carbon. The aliphatic amino acid hydrochloride may be a hydrochloride of a diamino acid or an amino dicarboxylic acid.

For example, the aliphatic amino acid hydrochloride may be a hydrochloride of a $C_{1-6}$ aliphatic amino acid substituted with a $C_{1-4}$ alkyl.

Specifically, the aliphatic amino acid hydrochloride may be at least one selected from the group consisting of (methylamino)butyric acid hydrochloride, (methylamino)propionic acid hydrochloride, and (methylamino)acetic acid hydrochloride. For example, the aliphatic amino acid hydrochloride may be 4-(methylamino)butyric acid•HCl (MAB•HCl), 3-(methylamino)butyric acid•HCl, 2-(methylamino)butyric acid•HCl, 3-(methylamino)propionic acid•HCl, or 2-(methylamino)acetic acid•HCl. The use of the aliphatic amino acid hydrochloride may increase the yield of polyarylene sulfide and may enhance the ease of use. More preferably, 4-(methylamino)butyric acid•HCl (MAB•HCl) and the like may be used.

The aliphatic amino acid hydrochloride may be used in an amount of about 0.01 to 0.50 equivalents based on 1 equivalent of the sulfur source, which is about 1 to 50 mol % based on 100 mol % of the sulfur source. More specifically, the aliphatic amino acid hydrochloride may be used in an amount of about 0.05 equivalents or more, about 0.05 to about 0.45 equivalents, about 0.15 equivalents or more, about 0.15 to about 0.40 equivalents, about 0.20 equivalents or more, or about 0.20 to about 0.30 equivalents. The aliphatic amino acid hydrochloride may be used in an amount of about 0.01 equivalents or more to increase the yield. In addition, when the aliphatic amino acid hydrochloride is used in an amount exceeding about 0.50 equivalents, the polymerization reaction of a polyarylene sulfide may be inhibited and the yield may be lowered.

Meanwhile, the sulfide of an alkali metal may be determined depending on the type of the hydrosulfide of an alkali metal used in the reaction. Specific examples thereof include lithium sulfide, sodium sulfide, potassium sulfide, rubidium sulfide, and cesium sulfide, and any one or a mixture of two or more thereof may be used.

Specific examples of the hydrosulfide of an alkali metal that can be used in the preparation of the sulfur source by reacting the hydrosulfide of an alkali metal with the hydroxide of an alkali metal include lithium hydrogen sulfide, sodium hydrogen sulfide, potassium hydrogen sulfide, rubidium hydrogen sulfide, cesium hydrogen sulfide, and the like. Any one or a mixture of two or more thereof may be used, and an anhydride or a hydrate thereof may be used.

Specific examples of the hydroxide of an alkali metal include lithium hydroxide, sodium hydroxide, potassium hydroxide, rubidium hydroxide, cesium hydroxide, and the like, and any one or a mixture of two or more thereof may be used. The hydroxide of an alkali metal may be used in an amount of 0.90 to 2.0 equivalents, more specifically 1.0 to 1.5 equivalents, and more particularly 1.0 to 1.2 equivalents, based on 1 equivalent of the hydrosulfide of an alkali metal.

In the present disclosure, the equivalent (eq.) refers to molar equivalent (eq/mol).

Further, in the preparation of the sulfur source by the reaction of the hydrosulfide of an alkali metal with the hydroxide of an alkali metal, an organic acid salt of an alkali metal capable of promoting the polymerization reaction and raising the degree of polymerization of a polyarylene sulfide in a short period of time may be added as a polymerization assistant. Specific examples of the organic acid salt of an alkali metal include lithium acetate, sodium acetate, and the like, and any one or a mixture of two or more thereof may be used. The organic acid salt of an alkali metal may be used in an amount of about 0.01 to 1.0 equivalents, specifically about 0.01 to 0.8 equivalents, and more specifically about 0.05 to 0.5 equivalents, based on 1 equivalent of the hydrosulfide of an alkali metal.

The reaction between the hydrosulfide of an alkali metal and the hydroxide of an alkali metal may be carried out in a mixed solvent of water and an amide-based compound. Specific examples of the amide-based compound include amide compounds such as N,N-dimethylformamide or N,N-dimethylacetamide; pyrrolidone compounds such as N-methyl-2-pyrrolidone (NMP) or N-cyclohexyl-2-pyrrolidone; caprolactam compounds such as N-methyl-ε-caprolactam; imidazolidinone compounds such as 1,3-dialkyl-2-imidazolidinone; urea compounds such as tetramethyl urea; phosphoric acid amide compounds such as hexamethylphosphoric acid triamide; and the like, and any one or a mixture of two or more thereof may be used. Among them, the amide-based compound may preferably be N-methyl-2-pyrrolidone (NMP), considering reaction efficiency and a cosolvent effect as a polymerization solvent for preparing a polyarylene sulfide.

Water may be used in an amount of about 1 to 8 equivalents, specifically about 1.5 to 5 equivalents, and more specifically about 2.5 to 5 equivalents, based on 1 equivalent of the amide-based compound.

Meanwhile, in the first step, a sulfide of an alkali metal may be prepared by dehydrating reactants containing a hydrosulfide of an alkali metal, a hydroxide of an alkali metal, and the like. Herein, the dehydration reaction may be performed by stirring at about 100 rpm to 500 rpm at a temperature of about 130° C. to 205° C. More specifically, the dehydration reaction may be performed by stirring at about 100 rpm to 300 rpm at a temperature of about 175° C. to 200° C. The dehydration reaction may be performed for about 30 minutes to 6 hours, or for about 1 hour to 3 hours.

During the dehydration reaction, the solvent such as water in the reactants may be removed by distillation or the like, and some of the amide-based compound may be discharged together with the water. In addition, some of the sulfur contained in the sulfur source may react with water by heat during the dehydration reaction, and may be volatilized as hydrogen sulfide gas.

As a result of the reaction of the hydrosulfide of an alkali metal, the hydroxide of an alkali metal, and the alkali metal salt, a sulfide of an alkali metal is precipitated in a solid phase in a mixed solvent of water and an amide-based compound. Accordingly, when the sulfur source prepared by reacting the hydrosulfide of an alkali metal with the hydroxide of an alkali metal is used as a sulfur source in the preparation of a polyarylene sulfide according to the present disclosure, the molar ratio of the sulfur source refers to a molar ratio of the hydrosulfide of an alkali metal introduced during the reaction.

Subsequently, in order to remove the solvent such as water from the reaction product containing the sulfide of an alkali metal produced as a result of the above reaction, a dehydration process is performed. The dehydration process may be carried out according to a method that is well known in the art. The conditions are not particularly limited, and the specific process conditions are as described above.

Further, during the dehydration reaction, the sulfur contained in the sulfur source reacts with water to produce hydrogen sulfide and a hydroxide of an alkali metal, and the generated hydrogen sulfide is volatilized. Therefore, the amount of sulfur in the sulfur source remaining in the system after the dehydration reaction may be reduced by the hydrogen sulfide which is volatilized out of the system during the dehydration reaction. For example, when using the sulfur source mainly containing a hydrosulfide of an alkali metal, the amount of sulfur remaining in the system after the dehydration reaction is equal to the molar amount of sulfur in the introduced sulfur source minus the molar amount of hydrogen sulfide volatilized out of the system. Therefore, it is necessary to quantify the amount of effective sulfur contained in the sulfur source remaining in the system after the dehydration reaction from the amount of hydrogen sulfide volatilized out of the system. Specifically, the dehydration reaction is carried out until the molar ratio of water to 1 mol of effective sulfur is 1 to 5, specifically 1.5 to 4, more specifically 1.75 to 3.5. When the water content in the sulfur source is excessively decreased by the dehydration reaction, water may be added to adjust the water content before the polymerization process.

Accordingly, the sulfur source prepared by the reaction of the hydrosulfide of an alkali metal with the hydroxide of an alkali metal and the dehydration as described above may include a mixed solvent of water and an amide-based compound together with a sulfide of an alkali metal, and the water may be included in a molar ratio of 1.75 to 3.5 based on 1 mol of sulfur contained in the sulfur source. In addition, the sulfur source may further include a hydroxide of an alkali metal prepared by the reaction of sulfur with water.

According to an embodiment of the present disclosure, the second step is polymerizing the sulfur source with a dihalogenated aromatic compound to prepare a polyarylene sulfide.

The dihalogenated aromatic compound usable for the preparation of the polyarylene sulfide is a compound in which two hydrogen atoms of an aromatic ring are substituted with halogen atoms. Specific examples thereof include o-dihalobenzene, m-dihalobenzene, p-dihalobenzene, dihalotoluene, dihalonaphthalene, dihalobiphenyl, dihalobenzoic acid, dihalodiphenyl ether, dihalodiphenyl sulfone, dihalodiphenyl sulfoxide, and dihalodiphenyl ketone, and any one or a mixture of two or more thereof may be used. In the dihalogenated aromatic compound, the halogen atom may be fluorine, chlorine, bromine or iodine. Among them, p-dichlorobenzene (p-DCB) may preferably be used in order to increase reactivity and suppress side reactions in the preparation of a polyarylene sulfide.

The dihalogenated aromatic compound may be added in an amount of about 0.8 to 1.2 equivalents based on 1 equivalent of the sulfur source. When the dihalogenated aromatic compound is added within the above range, a polyarylene sulfide having excellent physical properties may be obtained without lowering melting viscosity of the prepared polyarylene sulfide and increasing the content of chlorine present in the polyarylene sulfide. Considering the excellent effect of controlling the addition amount of the sulfur source and the dihalogenated aromatic compound, the dihalogenated aromatic compound may be added in an amount of about 0.9 to 1.1 equivalents.

Further, a step of lowering the temperature of the reactor containing the sulfur source to a temperature of about 150° C. to 200° C. may be further included before the second step to prevent vaporization of the dihalogenated aromatic compound.

Further, the polymerization reaction of the sulfur source and the dihalogenated aromatic compound may be carried out in a solvent of an amide-based compound which is a polar aprotic organic solvent and stable to an alkali at a high temperature.

Specific examples of the amide-based compound are as described above, and pyrrolidone compounds such as N-methyl-2-pyrrolidone (NMP) or N-cyclohexyl-2-pyrrolidone are preferable considering the reaction efficiency.

Since the amide-based compound contained in the sulfur source in the first step functions as a co-solvent, the amide-based compound may be added in the second step in a molar ratio of water ($H_2O$) to the amide-based compound present in the polymerization system (a ratio of water/an amide-based compound) to be about 0.85 or more.

During the polymerization reaction, other additives such as a molecular weight regulator, a cross-linking agent, and the like for controlling the polymerization reaction or the molecular weight may be further added in an amount not lowering physical properties and the yield of the polyarylene sulfide to be finally prepared.

The polymerization reaction of the sulfur source and the dihalogenated aromatic compound may be carried out at about 200° C. to 300° C. Alternatively, the polymerization reaction may be carried out in multiple steps, while varying the temperature within the above-mentioned temperature range. Specifically, after the first polymerization reaction at about 200° C. or more and less than 250° C., the second polymerization reaction may be carried out at a temperature higher than that of the first polymerization reaction, specifically at about 250° C. to 300° C.

A reaction product prepared as a result of the above polymerization reaction is separated into an aqueous phase and an organic phase, and a polyarylene sulfide, which is a product of the polymerization reaction, is dissolved in the organic phase. Accordingly, a process for precipitation and separation of the prepared polyarylene sulfide may be selectively performed.

In particular, the precipitation of the polyarylene sulfide may be carried out by adding water to the reaction mixture in an amount of 3 to 5 equivalents based on 1 equivalent of sulfur, and then cooling. When the water is added within the above range, the polyarylene sulfide may be precipitated with excellent efficiency.

The precipitated polyarylene sulfide may be optionally further subjected to washing, filtration, and drying according to conventional methods.

As a specific preparation method of the polyarylene sulfide, the following examples may be referred to. However, the preparation method of the polyarylene sulfide is not limited to this description. The preparation method may further include a step which is usually carried out in the technical field of the present invention, and the step(s) of the preparation method may be changed by step(s) that are usually changeable.

Meanwhile, the preparation method of a polyarylene sulfide according to an embodiment of the present disclosure as described above may easily produce a polyarylene sulfide having a thermal property equal to or higher than that of the conventional method at an excellent yield.

Specifically, the polyarylene sulfide may be prepared by the above preparation method at a yield of about 66.5% or more, about 70% or more, or about 74% or more.

The polyarylene sulfide is melted under a $N_2$ atmosphere, and frequency sweeping is performed to confirm the viscosity change using an ARES-G2 rheometer. The value at a frequency of 0.10 Hz is referred to as melt viscosity (M.V.). The melt viscosity (M.V.) may be as high as about 60 PaS or more, or about 60 PaS to 400 PaS. The polyarylene sulfide may have a high melt viscosity of about 79 PaS or more, about 79 PaS to 400 PaS, about 89 PaS or more, about 89 PaS to 400 PaS, about 260 PaS or more, or about 260 PaS to 400 PaS.

The polyarylene sulfide may have a melting point (Tm) of about 270° C. to 300° C., about 275° C. to 295° C., about 277° C. to 290° C., or about 280° C. to 285° C. The polyarylene sulfide may have a crystallization point (Tc) of about 200° C. to 250° C., about 210° C. to 245° C., about 215° C. to 235° C., or about 220° C. to 232° C. In addition, the polyarylene sulfide may have a weight average molecular weight (Mw) of about more than 10,000 g/mol and 30,000 g/mol or less. Herein, the melting point (Tm) and the crystallization point (Tc) of the polyarylene sulfide may be measured using a differential scanning calorimeter (DSC, manufactured by TA instrument, TA Q2000). As the measuring method is well known in the art, a detailed description thereof will be omitted.

The polyarylene sulfide may have a Cl content measured using a dispersive X-ray fluorescence spectrometer (ED-XRF) of about 3200 ppm or less, about 2000 ppm to 3200 ppm, about 3000 ppm or less, about 2100 ppm to 3000 ppm, about 2985 ppm or less, or about 2143 ppm to 2985 ppm, based on a total weight of the polyarylene sulfide.

Hereinafter, the present invention will be described in more detail with reference to the following preferred examples. However, these examples are for illustrative purposes only, and the invention is not intended to be limited by these examples.

EXAMPLES

Example 1

Sodium sulfide was prepared by reacting sodium hydrosulfide (NaSH), sodium hydroxide (NaOH), and the like according to the method shown in FIG. 1 to prepare a polyphenylene sulfide (PPS) polymer. First, 1.01 equivalents (eq.) of 70% sodium hydrosulfide (NaSH), 1.05 equivalents of sodium hydroxide (NaOH), 0.44 equivalents of sodium acetate (NaOAc) powder, 1.65 equivalents of N-methyl-2-pyrrolidone (NMP), 4.72 equivalents of DI water, and 0.05 equivalents of 4-(methylamino)butyric acid hydrochloride (MAB•HCl, 4-(methylamino)butyric acid•HCl) were placed in a reactor, and the reactor closure was tightened. A material of the reactor was stainless steel (SUS316L), and maximum pressure was 40 bar. The inside of the reactor was made to have a nitrogen atmosphere, and then the nitrogen line was removed. When a dehydration valve was opened and the temperature was gradually raised, dehydrated reactant was released from the inside of the reactor. An ice bath was installed at the bottom to liquefy the dehydrated reactant and collect it. Thereafter, when the reactor temperature reached 190° C., the dehydration valve was closed and the heater was turned off to lower the temperature.

Subsequently, the temperature of the reactant was lowered to 175° C., and a solution in which 1.00 equivalents of p-dichlorobenzene (p-DCB) was dissolved in 1.35 equivalents of N-methyl-2-pyrrolidone (NMP) was added into the reactor using a metering pump. After the addition of p-dichlorobenzene (p-DCB) and N-methyl-2-pyrrolidone (NMP), the temperature of the reactor was maintained at 165° C. for about 10 minutes to stabilize the reactor. The temperature was raised to 230° C., and the reaction was carried out at this temperature for 2 hours. Then, the temperature was further raised to 250° C. for 15 minutes, and the reaction was carried out at this temperature for 2 hours.

After completion of the reaction, 3.03 equivalents of DI water based on 1 equivalent of sulfur was added to the reactor. After 5 minutes, the valve was opened to remove the unreacted p-DCB and solvent. Thereafter, when the pressure became equal to normal pressure, the reactor was opened to collect a PPS slurry. The obtained PPS slurry was washed in a mixed solution of NMP and DI water at room temperature, filtered, and then washed again with water. Thereafter, it was washed twice with NMP at 100° C., once with an aqueous solution of 0.4 wt % acetic acid at 100° C., and four times with DI water at 100° C. until the pH reached 7, and then dried using a convection oven and a vacuum oven.

Example 2

A PPS polymer was prepared in the same manner as in Example 1, except that 0.20 equivalent of 4-(methylamino) butyric acid hydrochloride (MAB•HCl, 4-(methylamino) butyric acid•HCl) was added.

Example 3

A PPS polymer was prepared in the same manner as in Example 2, except that 2-(methylamino)butyric acid hydrochloride (2-MAB•HCl, 2-(methylamino)butyric acid•HCl) was added instead of 4-(methylamino)butyric acid hydrochloride (MAB•HCl, 4-(methylamino)butyric acid•HCl).

Example 4

A PPS polymer was prepared in the same manner as in Example 2, except that 3-(methylamino)butyric acid hydrochloride (3-MAB•HCl, 3-(methylamino)butyric acid•HCl) was added instead of 4-(methylamino)butyric acid hydrochloride (MAB•HCl, 4-(methylamino)butyric acid•HCl).

Comparative Example 1

Sodium sulfide was prepared by reacting sodium hydrosulfide (NaSH), sodium hydroxide (NaOH), and the like according to the method shown in FIG. 2 to prepare a PPS polymer. First, 1.01 equivalents of 70% sodium hydrosulfide (NaSH), 1.05 equivalents of sodium hydroxide (NaOH), 0.44 equivalents of sodium acetate (NaOAc) powder, 1.65 equivalents of N-methyl-2-pyrrolidone (NMP), and 4.72 equivalents of DI water were placed in a reactor, and the reactor closure was tightened. A material of the reactor was stainless steel (SUS316L), and maximum pressure was 40 bar. The inside of the reactor was made to have a nitrogen atmosphere, and then the nitrogen line was removed. When a dehydration valve was opened and the temperature was gradually raised, dehydrated reactant started to come out from the inside of the reactor. An ice bath was installed at the bottom to liquefy the dehydrated reactant and collect it. Thereafter, when the reactor temperature reached 190° C., the dehydration valve was closed and the heater was turned off to lower the temperature.

Subsequently, the temperature of the reactant was lowered to 175° C., and a solution in which 1.00 equivalents of p-dichlorobenzene (p-DCB) was dissolved in 1.35 equivalents of N-methyl-2-pyrrolidone (NMP) was added into the reactor using a metering pump. After the addition of p-dichlorobenzene (p-DCB) and N-methyl-2-pyrrolidone (NMP), the temperature of the reactor was maintained at 165° C. for about 10 minutes to stabilize the reactor. The temperature was raised to 230° C., and the reaction was carried out at this temperature for 2 hours. Then, the temperature was further raised to 250° C. for 15 minutes, and the reaction was carried out at this temperature for 2 hours.

After completion of the reaction, 3.03 equivalents of DI water based on 1 equivalent of sulfur were added to the reactor. After 5 minutes, the valve was opened to remove the unreacted p-DCB and solvent. Thereafter, when the pressure became equal to normal pressure, the reactor was opened to collect a PPS slurry. The obtained PPS slurry was washed in a mixed solution of NMP and DI water at room temperature, filtered, and then washed again with water. Thereafter, it was washed twice with NMP at 100° C., once with an aqueous solution of 0.4 wt % acetic acid at 100° C., and four times with DI water at 100° C. until the pH reached 7, and then dried using a convection oven and a vacuum oven.

Comparative Example 2

A PPS polymer was prepared in the same manner as in Example 1, except that 4-(methylamino)butyric acid (MAB) was added instead of 4-(methylamino)butyric acid hydrochloride (MAB•HCl, 4-(methylamino)butyric acid•HCl).

Comparative Example 3

A PPS polymer was prepared in the same manner as in Comparative Example 1, except that 0.05 equivalents of 4-(methylamino)butyric acid hydrochloride (MAB•HCl, 4-(methylamino)butyric acid•HCl) was further added to the reactor together with p-dichlorobenzene (p-DCB) to carry out the polymerization process.

Experimental Example 1

Physical properties of the polyphenylene sulfide prepared in Examples 1 to 4 and Comparative Examples 1 to 3 were measured in the following manner, and the results are shown in Table 1 below.

1) Yield (%): The weight of the collected polyphenylene sulfide was measured with an electronic balance.

2) M.V. (PaS): PPS was melted under a $N_2$ atmosphere and frequency sweeping was performed to confirm the viscosity change using ARES-G2 rheometer. The value at a frequency of 0.10 Hz was referred to as melt viscosity (M.V.).

3) Cl (ppm): The Cl content of PPS was measured using a dispersive X-ray fluorescence spectrometer (ED-XRF).

4) Melting point (Tm): It was measured using differential scanning calorimeter (DSC, manufactured by TA Instruments, TA Q2000).

5) Crystallization point (Tc): It was measured using differential scanning calorimeter (DSC, manufactured by TA Instruments, TA Q2000).

TABLE 1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Composition (eq.) | NaSH | 1.01 | 1.01 | 1.01 | 1.01 | 1.01 | 1.01 | 1.01 |
|  | NaOH | 1.05 | 1.05 | 1.05 | 1.05 | 1.05 | 1.05 | 1.05 |
|  | NaOAc | 0.44 | 0.44 | 0.44 | 0.44 | 0.44 | 0.44 | 0.44 |
|  | 4-(methylamino) butyric acid•HCl | 0.05 | 0.20 | — | — | — | — | 0.05 (added in polymerization) |

TABLE 1-continued

| | | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| | | | | | | | | process) |
| | 2-(methylamino) butyric acid•HCl | — | — | 0.20 | — | — | — | — |
| | 3-(methylamino) butyric acid•HCl | — | — | — | 0.20 | — | — | — |
| | 4-(methylamino) butyric acid | — | — | — | — | — | 0.05 | — |
| | H$_2$O/S | 2.83 | 2.66 | 2.83 | 2.79 | 3.05 | 2.83 | 2.65 |
| Physical properties | Yield (%) | 66.8 | 77.1 | 74.2 | 74.0 | 64.2 | 65.2 | 65.8 |
| | M.V. (PaS) | 261.7 | 60.27 | 89.2 | 79.4 | 32.87 | 52.2 | 98.4 |
| | Cl (ppm) | 2731 | 2858 | 2143 | 2984 | 4551 | 3412 | 1872 |
| | Tm (° C.) | 281.3 | 281.7 | 279.6 | 277.2 | 278.3 | 281.2 | 275.2 |
| | Tc (° C.) | 220.8 | 230.4 | 228.2 | 227.4 | 221.2 | 224.2 | 229.7 |

The invention claimed is:

1. A preparation method of a polyarylene sulfide, comprising:
   preparing a sulfur source comprising a sulfide of an alkali metal by dehydrating a hydrosulfide of an alkali metal and a hydroxide of an alkali metal in the presence of an organic acid salt of an alkali metal and a C$_{1-20}$ aliphatic amino acid hydrochloride in a mixed solvent of water and an amide-based compound; and
   adding a dihalogenated aromatic compound and an amide-based compound to a reactor containing the sulfur source, and performing a polymerization reaction to prepare a polyarylene sulfide.

2. The preparation method of a polyarylene sulfide according to claim 1, wherein the aliphatic amino acid hydrochloride is used in an amount of 0.01 to 0.50 equivalents based on 1 equivalent of the sulfur source.

3. The preparation method of a polyarylene sulfide according to claim 1, wherein the aliphatic amino acid hydrochloride is at least one selected from the group consisting of (methylamino)butyric acid hydrochloride, (methylamino)propionic acid hydrochloride, and (methylamino)acetic acid hydrochloride.

4. The preparation method of a polyarylene sulfide according to claim 1, wherein the water is used in an amount of 1 to 8 equivalents based on 1 equivalent of the amide-based compound.

5. The preparation method of a polyarylene sulfide according to claim 1, wherein the organic acid salt of an alkali metal is used in an amount of 0.01 to 1.0 equivalents based on 1 equivalent of the hydrosulfide of an alkali metal.

6. The preparation method of a polyarylene sulfide according to claim 1, wherein the organic acid salt of an alkali metal comprises lithium acetate, sodium acetate, or a mixture thereof.

7. The preparation method of a polyarylene sulfide according to claim 1, wherein the dehydration reaction is performed at a temperature of 130° C. to 205° C.

8. The preparation method of a polyarylene sulfide according to claim 1, wherein the dihalogenated aromatic compound comprises at least one selected from the group consisting of o-dihalobenzene, m-dihalobenzene, p-dihalobenzene, dihalotoluene, dihalonaphthalene, dihalobiphenyl, dihalobenzoic acid, dihalodiphenyl ether, dihalodiphenyl sulfone, dihalodiphenyl sulfoxide, and dihalodiphenyl ketone.

9. The preparation method of a polyarylene sulfide according to claim 1, wherein the dihalogenated aromatic compound is used in an amount of 0.8 to 1.2 equivalents based on 1 equivalent of the sulfur source.

10. The preparation method of a polyarylene sulfide according to claim 1, wherein the polyarylene sulfide is produced at a yield of 66.5% or more, and has a melting point (Tm) of 270° C. to 300° C. and a crystallization point (Tc) of 200° C. to 250° C.

11. The preparation method of a polyarylene sulfide according to claim 1, further comprising a step of lowering the temperature of the reactor containing the sulfur source to a temperature of 150° C. to 200° C. before the polymerization step.

12. The preparation method of a polyarylene sulfide according to claim 1, further comprising a cooling step of adding water to the reaction mixture in an amount of 3 to 5 equivalents based on 1 equivalent of sulfur after the polymerization step.

13. The preparation method of a polyarylene sulfide according to claim 12, further comprising a step of washing and then drying the reaction mixture using water and an amide-based compound after the cooling step.

* * * * *